Figure 1:
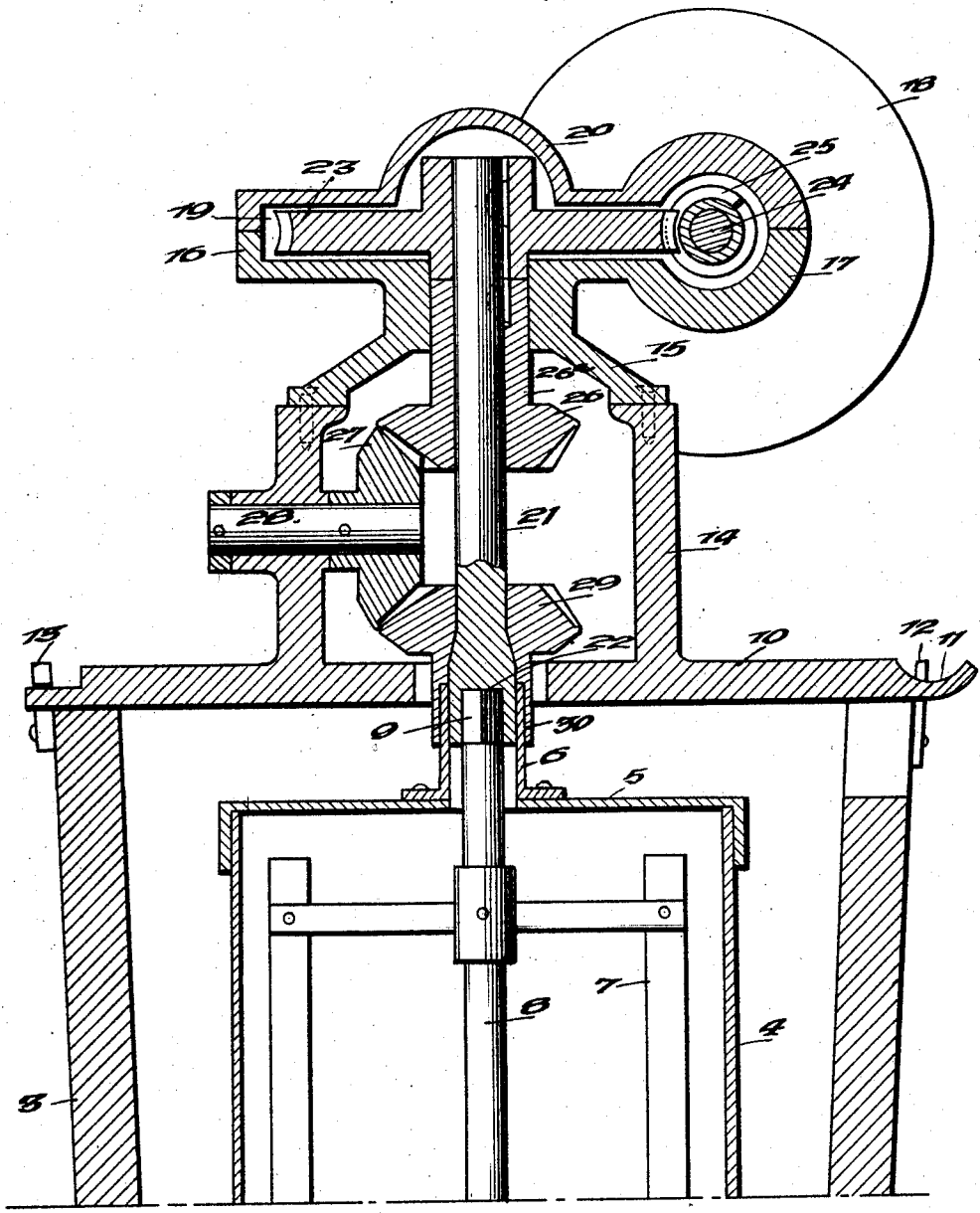

Oct. 27, 1925.  
J. B. McFERRAN, JR  
1,558,738  
DRIVING APPARATUS FOR ICE CREAM FREEZERS  
Filed April 22, 1924   2 Sheets-Sheet 1

Inventor  
John B. McFerran, Jr.

By  
Attorney

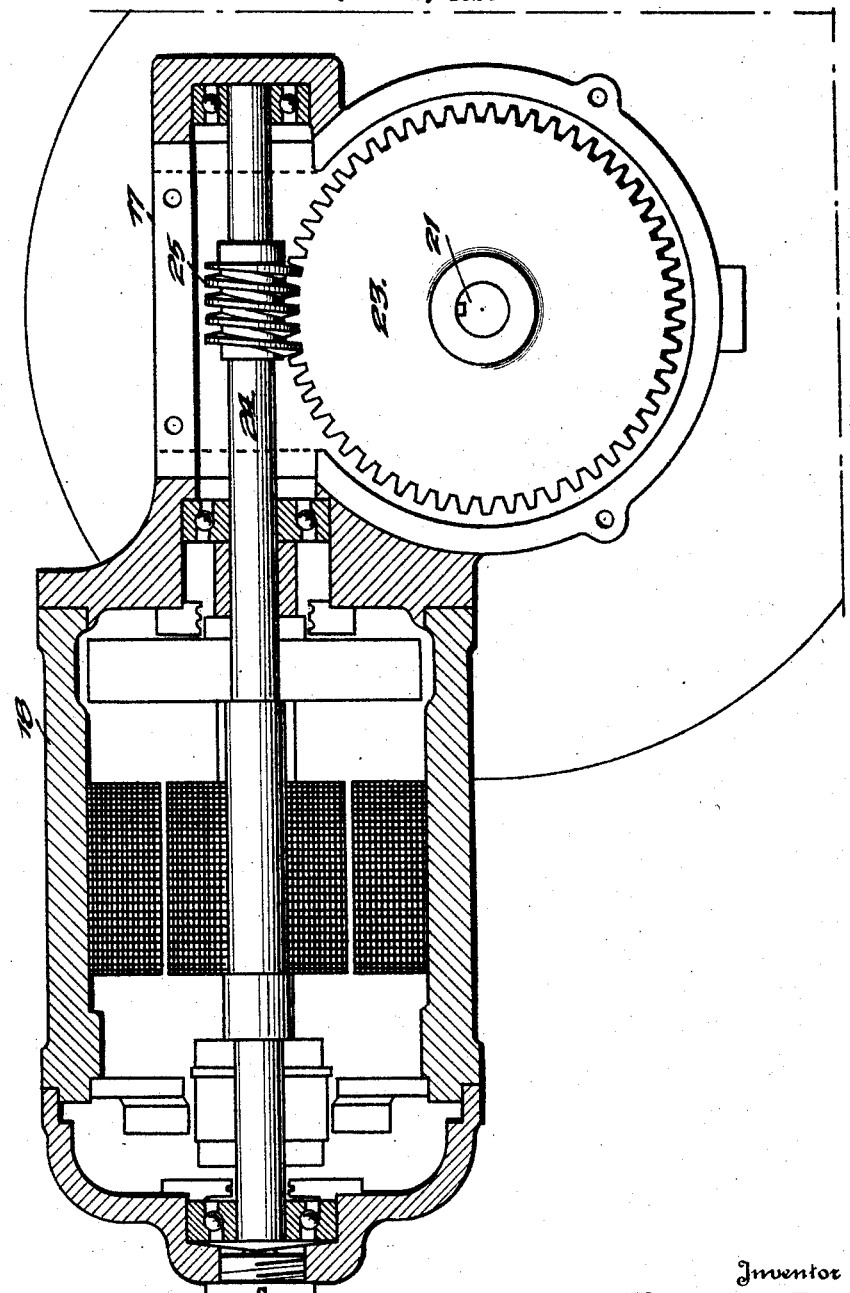

Patented Oct. 27, 1925.

1,558,738

UNITED STATES PATENT OFFICE.

JOHN B. McFERRAN, JR., OF LOUISVILLE, KENTUCKY.

DRIVING APPARATUS FOR ICE-CREAM FREEZERS.

Application filed April 22, 1924. Serial No. 708,140.

*To all whom it may concern:*

Be it known that I, JOHN B. MCFERRAN, Jr., a citizen of the United States, residing at Louisville, in the county of Jefferson and State of Kentucky, have invented certain new and useful Improvements in Driving Apparatus for Ice-Cream Freezers, of which the following is a specification.

The object of the present invention is to provide electrically driven mechanism for ice cream freezers that is simple, compact and entirely practical.

In the accompanying drawings:—

Figure 1 is a vertical sectional view, through a portion of an ice cream freezer, and the novel driving mechanism, Figure 2 is a horizontal sectional view.

In the embodiment disclosed, a portion of the outer container or tub is shown at 3, and located therein is the usual rotary cream can or container 4, having a top 5 provided with an upstanding coupling element 6. A stirrer or agitator 7 is carried by a vertical shaft 8 extending upwardly within the coupling member 6 and having an upper angular coupling end 9.

The driving apparatus for the can 4 and stirrer 7 is mounted on a bridge piece 10 having a hooked end 11 adapted to engage under a keeper 12, the other end being adapted to be secured by the usual hook 13. This bridge piece supports an upstanding gear case 14 having an open upper end, on which is detachably mounted a cap 15. The cap 15 has an enlargement 16 from one side of which extends the mounting 17 for an electric motor 18. This enlargement 16 is provided with a chamber 19 closed by a removable cap 20. Said cap also extends over a portion of the motor support 17.

A vertical shaft 21 extends downwardly from the chamber 19, through the center of the gear case 14, and has its lower end provided with an angular socket 22 that receives the squared end 9 of the agitator shaft 8. Fixed to the upper end of the shaft 21, and located in the chamber 19, is a horizontal worm gear 23. The motor 18 has a shaft 24 extending into the open portion of the chamber 19, and said shaft has a worm 25 in said portion of the chamber, which worm is in mesh with the worm wheel 23. A beveled gear 26 is provided with a hub 26$^a$ fixed to the shaft 21, and journaled in the cap 15 below the chamber 19. This gear 26 is thus located in the gear case. It meshes with a power-transmitting gear 27, also located in the gear case 14, said gear 27 being carried by a spindle 28 journaled in one side of the gear case 14. The gear 27 meshes with a third beveled gear 29 that is journaled on the lower end of the shaft 21 and is provided with a depending hub portion 30 constituting a coupling element that detachably interlocks with the coupling member 6 of the cover 5 of the can 4.

When the parts are assembled in the relation shown and the motor 18 is in operation, motion will be transmitted to the worm gear 23, thereby rotating the shaft 21 and imparting rotation in one direction to the agitator 7. Through the gearing 26, 27, and 29, it will be evident that the can will be rotated in the opposite direction. The structure is obviously relatively simple, it is very compact, the parts are housed, and yet they are readily available through the removal of the cap 20 and cap 15.

From the foregoing, it is throught that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:—

1. In driving mechanism for ice cream freezers, a gear case having an open top, a cap on said top, a vertical shaft extending through the gear case into the top, a loose gear journaled on the lower end of the shaft in the gear case, a gear fixed to the shaft within the gear case, a reversing gear in the gear case in mesh with the fixed and loose gears, a gear fixed to the upper end of the shaft within the cap, and a motor having a gear element in mesh with the gear in the cap.

2. In driving mechanism for ice cream freezers, a bridge piece for mounting on a freezer tub, a gear case thereon, having an open top, a cap on said top, a vertical shaft extending through the gear case into the cap, a loose gear journaled on the lower end of the shaft in the gear case and having a coupling at its lower end, a gear fixed to the shaft within the gear case, a reversing gear in the gear case in mesh with the fixed and loose gears, a worm gear fixed to the upper end of the shaft within the cap, and a motor having a worm within the cap in mesh with the worm gear.

In testimony whereof, I affix my signature.

JOHN B. McFERRAN, Jr.